United States Patent
Myrick et al.

(10) Patent No.: US 8,212,213 B2
(45) Date of Patent: Jul. 3, 2012

(54) CHEMICALLY-SELECTIVE DETECTOR AND METHODS RELATING THERETO

(75) Inventors: Michael L. Myrick, Irmo, SC (US); Heather Brooke, Alexandria, VA (US); Stephen L. Morgan, Columbia, SC (US); Megan R. Pearl, Columbia, SC (US)

(73) Assignee: Halliburton Energy Services, Inc., Houston, TX (US)

( * ) Notice: Subject to any disclaimer, the term of this patent is extended or adjusted under 35 U.S.C. 154(b) by 347 days.

(21) Appl. No.: 12/419,533

(22) Filed: Apr. 7, 2009

(65) Prior Publication Data

US 2009/0250613 A1 Oct. 8, 2009

Related U.S. Application Data

(60) Provisional application No. 61/123,295, filed on Apr. 7, 2008.

(51) Int. Cl.
*G01J 1/00* (2006.01)
*G01J 1/04* (2006.01)
*G01J 5/06* (2006.01)
*G01J 5/02* (2006.01)
*G01J 5/12* (2006.01)

(52) U.S. Cl. ............. 250/336.1; 250/338.1; 250/339.01; 250/339.02; 374/142

(58) Field of Classification Search ................ 250/338.1, 250/338.4, 339.01, 339.02, 338.5, 482.1, 250/341.1; 374/142
See application file for complete search history.

(56) References Cited

U.S. PATENT DOCUMENTS

| | | | |
|---|---|---|---|
| 3,632,435 A | 1/1972 | Eriksson et al. | |
| 3,717,078 A | 2/1973 | Ogura | |
| 3,761,724 A | 9/1973 | Dennis | |
| 4,084,880 A | 4/1978 | Clow | |
| 4,118,106 A | 10/1978 | Leith | |
| 4,499,378 A | 2/1985 | Miyatake et al. | |
| 4,595,832 A | 6/1986 | LaDelfe et al. | |
| 4,607,914 A | 8/1986 | Fienup | |
| 4,687,335 A | 8/1987 | Zupanick et al. | |
| 4,687,337 A | 8/1987 | Stewart et al. | |
| 4,704,536 A | 11/1987 | Sugiyama et al. | |

(Continued)

FOREIGN PATENT DOCUMENTS

EP 0 600 334 A2 6/1996

(Continued)

OTHER PUBLICATIONS

Zagonel et al. (2004) "Multivariate Monitoring of Soybean Oil Ethanolysis by FTIR", *Talanta*, vol. 63, No. 4, pp. 1021-1025.

(Continued)

*Primary Examiner* — David Porta
*Assistant Examiner* — Yara Green
(74) *Attorney, Agent, or Firm* — Haynes and Boone, LLP

(57) ABSTRACT

In accordance with certain embodiments of the present disclosure, a method for adjusting the spectral detectivity of a thermal detector is described. The method includes coating the light sensitive portion of a thermal detector with a first material to reduce the response of the detector. The first material is coated with a second material that is thermally thin and has spectral absorption characteristics. The second material is coated with a third material that is thermally thick, whereby the spectral absorbance of the second material as filtered by the third material primarily determines the thermal conversion of the thermal detector.

29 Claims, 6 Drawing Sheets

U.S. PATENT DOCUMENTS

| | | |
|---|---|---|
| 4,821,338 A | 4/1989 | Naruse et al. |
| 4,891,574 A | 1/1990 | Nagaya et al. |
| 4,917,958 A | 4/1990 | Akai et al. |
| 4,934,782 A | 6/1990 | Soffer et al. |
| 4,968,148 A | 11/1990 | Chow et al. |
| 4,981,332 A | 1/1991 | Smith |
| 5,005,946 A | 4/1991 | Brandstetter |
| 5,029,245 A | 7/1991 | Keranen et al. |
| 5,071,526 A | 12/1991 | Pletcher et al. |
| 5,090,807 A | 2/1992 | Tai |
| 5,103,340 A | 4/1992 | Dono et al. |
| 5,137,364 A | 8/1992 | McCarthy |
| 5,150,236 A | 9/1992 | Patel |
| 5,194,921 A | 3/1993 | Tambo et al. |
| 5,223,715 A | 6/1993 | Taylor |
| 5,259,381 A | 11/1993 | Cheung et al. |
| 5,289,289 A | 2/1994 | Nagasaki |
| 5,321,539 A | 6/1994 | Hirabayashi et al. |
| 5,406,082 A | 4/1995 | Pearson et al. |
| 5,412,465 A | 5/1995 | Baylor et al. |
| 5,424,545 A | 6/1995 | Block et al. |
| 5,459,677 A | 10/1995 | Kowalski et al. |
| 5,479,164 A | 12/1995 | Yorks et al. |
| 5,504,332 A | 4/1996 | Richmond et al. |
| 5,513,022 A | 4/1996 | Son et al. |
| 5,555,128 A | 9/1996 | Khoury et al. |
| 5,622,868 A | 4/1997 | Clarke et al. |
| 5,641,962 A | 6/1997 | Perry et al. |
| 5,710,655 A | 1/1998 | Rumbaugh et al. |
| 5,717,605 A | 2/1998 | Komiya et al. |
| 5,734,098 A | 3/1998 | Kraus et al. |
| 5,737,076 A | 4/1998 | Glaus et al. |
| 5,747,806 A | 5/1998 | Khalil et al. |
| 5,750,994 A | 5/1998 | Schlager |
| 5,760,399 A | 6/1998 | Trygstad |
| 5,771,096 A | 6/1998 | Andersen |
| 5,781,289 A | 7/1998 | Sabsabi et al. |
| 5,799,231 A | 8/1998 | Gates et al. |
| 5,828,492 A | 10/1998 | Moser et al. |
| 5,831,742 A | 11/1998 | Watson et al. |
| 5,905,571 A | 5/1999 | Butler et al. |
| 5,939,717 A | 8/1999 | Mullins |
| 5,941,821 A | 8/1999 | Chou |
| 5,945,676 A | 8/1999 | Khalil et al. |
| 5,946,088 A | 8/1999 | Aldridge |
| 5,946,089 A | 8/1999 | Duer |
| 5,991,048 A | 11/1999 | Karlson et al. |
| 6,006,585 A | 12/1999 | Forster |
| 6,040,914 A | 3/2000 | Bortz et al. |
| 6,124,937 A | 9/2000 | Mittenzwey et al. |
| 6,137,108 A | 10/2000 | DeThomas et al. |
| 6,176,323 B1 | 1/2001 | Weirich et al. |
| 6,198,531 B1 | 3/2001 | Myrick et al. |
| 6,304,854 B1 | 10/2001 | Harris |
| 6,317,648 B1 | 11/2001 | Sleep et al. |
| 6,347,131 B1 | 2/2002 | Gusterson |
| 6,350,389 B1 | 2/2002 | Fujishima et al. |
| 6,420,708 B2 | 7/2002 | Wilks, Jr. et al. |
| 6,430,513 B1 | 8/2002 | Wang et al. |
| 6,437,326 B1 | 8/2002 | Yamate et al. |
| 6,469,785 B1 | 10/2002 | Duveneck et al. |
| 6,476,384 B1 | 11/2002 | Mullins et al. |
| 6,490,035 B1 | 12/2002 | Folestad et al. |
| 6,517,230 B1 | 2/2003 | Afnan et al. |
| 6,522,945 B2 | 2/2003 | Sleep et al. |
| 6,529,276 B1 | 3/2003 | Myrick |
| 6,573,999 B1 | 6/2003 | Yang |
| 6,600,560 B2 | 7/2003 | Mikkelsen et al. |
| 6,630,663 B2 | 10/2003 | Murphy et al. |
| 6,667,802 B2 | 12/2003 | Faus et al. |
| 6,690,464 B1 | 2/2004 | Lewis et al. |
| 6,697,195 B2 | 2/2004 | Weber et al. |
| 6,707,043 B2 | 3/2004 | Coates et al. |
| 6,711,503 B2 | 3/2004 | Haaland |
| 6,737,654 B2 | 5/2004 | Ducourant |
| 6,741,335 B2 | 5/2004 | Kinrot et al. |
| 6,748,334 B1 | 6/2004 | Perez et al. |
| 6,765,212 B2 | 7/2004 | Goetz et al. |
| 6,771,369 B2 | 8/2004 | Rzasa et al. |
| 6,776,517 B2 | 8/2004 | Afnan et al. |
| 6,798,518 B2 | 9/2004 | Difoggio et al. |
| 6,853,447 B2 | 2/2005 | Goetz |
| 6,870,629 B1 | 3/2005 | Vogel et al. |
| 6,952,267 B2 | 10/2005 | Rarac |
| 6,980,285 B1 | 12/2005 | Hansen |
| 6,982,431 B2 | 1/2006 | Modlin et al. |
| 6,995,840 B2 | 2/2006 | Hagler |
| 7,006,214 B2 | 2/2006 | Rzasa et al. |
| 7,123,844 B2 | 10/2006 | Myrick |
| 7,138,156 B1 | 11/2006 | Myrick et al. |
| 7,145,145 B2 | 12/2006 | Benson |
| 7,173,239 B2 | 2/2007 | DiFoggio |
| 7,245,374 B2 | 7/2007 | Hendriks |
| 7,271,883 B2 | 9/2007 | Newell et al. |
| 7,348,493 B2 | 3/2008 | Osanai et al. |
| 7,399,968 B2 | 7/2008 | Lewis et al. |
| 7,405,825 B2 | 7/2008 | Schuurmans et al. |
| 7,411,729 B2 | 8/2008 | Lyama et al. |
| 7,569,354 B2 | 8/2009 | Okano et al. |
| 7,623,233 B2 | 11/2009 | Freese et al. |
| 7,652,767 B2 | 1/2010 | Harsh et al. |
| 7,671,973 B2 | 3/2010 | Van Beek et al. |
| 7,697,141 B2 | 4/2010 | Jones et al. |
| 7,853,104 B2 | 12/2010 | Oota et al. |
| 7,889,346 B2 | 2/2011 | Myrick et al. |
| 7,911,605 B2 | 3/2011 | Myrick et al. |
| 7,920,258 B2 | 4/2011 | Myrick et al. |
| 7,968,853 B2 * | 6/2011 | Altman et al. ........... 250/370.11 |
| 7,993,276 B2 | 8/2011 | Nazarian et al. |
| 2001/0034064 A1 | 10/2001 | Turner et al. |
| 2002/0008215 A1 | 1/2002 | Evans |
| 2002/0050567 A1 | 5/2002 | Boudet et al. |
| 2002/0071118 A1 | 6/2002 | Shinbori et al. |
| 2002/0108892 A1 | 8/2002 | Goetz et al. |
| 2002/0109094 A1 | 8/2002 | Goetz et al. |
| 2002/0154315 A1 | 10/2002 | Myrick |
| 2003/0056581 A1 | 3/2003 | Turner et al. |
| 2003/0059820 A1 | 3/2003 | Vo-Dinh |
| 2003/0071988 A1 | 4/2003 | Smith et al. |
| 2003/0094495 A1 | 5/2003 | Knowles et al. |
| 2003/0111606 A1 | 6/2003 | Berghmans et al. |
| 2003/0117628 A1 | 6/2003 | Harju et al. |
| 2003/0202179 A1 | 10/2003 | Larsen et al. |
| 2003/0207023 A1* | 11/2003 | Soni et al. ........................ 427/58 |
| 2004/0012782 A1 | 1/2004 | Mason et al. |
| 2004/0106098 A1 | 6/2004 | Chen et al. |
| 2004/0160601 A1 | 8/2004 | Womble et al. |
| 2004/0197850 A1 | 10/2004 | Baer et al. |
| 2004/0227086 A1 | 11/2004 | Haug et al. |
| 2005/0077476 A1 | 4/2005 | Poteet et al. |
| 2005/0087132 A1 | 4/2005 | Dickey et al. |
| 2005/0167264 A1 | 8/2005 | Sternbergh et al. |
| 2005/0251289 A1 | 11/2005 | Bonney et al. |
| 2005/0264815 A1 | 12/2005 | Wechsler et al. |
| 2005/0288906 A1 | 12/2005 | Drennen, III et al. |
| 2006/0035018 A1 | 2/2006 | Sakurai et al. |
| 2006/0051036 A1 | 3/2006 | Treado et al. |
| 2006/0093523 A1 | 5/2006 | Norman |
| 2006/0142955 A1 | 6/2006 | Jones et al. |
| 2006/0153492 A1 | 7/2006 | Treves et al. |
| 2006/0158734 A1 | 7/2006 | Schuurmans et al. |
| 2006/0169902 A1* | 8/2006 | Watanabe ................... 250/338.1 |
| 2006/0197015 A1 | 9/2006 | Sterling et al. |
| 2006/0276697 A1 | 12/2006 | Demuth et al. |
| 2007/0035737 A1 | 2/2007 | Andrews et al. |
| 2007/0137292 A1 | 6/2007 | Xian et al. |
| 2007/0201136 A1 | 8/2007 | Myrick |
| 2007/0282647 A1 | 12/2007 | Freese et al. |
| 2007/0294094 A1 | 12/2007 | Alessandrini et al. |
| 2008/0111064 A1 | 5/2008 | Andrews et al. |
| 2008/0231849 A1 | 9/2008 | Myrick |
| 2008/0276687 A1 | 11/2008 | Myrick et al. |
| 2008/0309930 A1 | 12/2008 | Rensen |
| 2009/0002697 A1 | 1/2009 | Freese et al. |
| 2009/0015819 A1 | 1/2009 | Van Beek et al. |
| 2009/0033933 A1 | 2/2009 | Myrick |
| 2009/0073433 A1 | 3/2009 | Myrick et al. |

| | | | |
|---|---|---|---|
| 2009/0097024 A1 | 4/2009 | Blackburn et al. |
| 2009/0140144 A1 | 6/2009 | Myrick et al. |
| 2009/0216504 A1 | 8/2009 | Priore et al. |
| 2009/0219538 A1 | 9/2009 | Myrick et al. |
| 2009/0250613 A1 | 10/2009 | Myrick et al. |
| 2009/0299946 A1 | 12/2009 | Myrick et al. |
| 2009/0316150 A1 | 12/2009 | Myrick et al. |
| 2010/0042348 A1 | 2/2010 | Bakker |
| 2010/0073666 A1 | 3/2010 | Perkins et al. |
| 2010/0141952 A1 | 6/2010 | Myrick et al. |
| 2010/0149537 A1 | 6/2010 | Myrick et al. |
| 2010/0153048 A1 | 6/2010 | Myrick et al. |
| 2010/0182600 A1 | 7/2010 | Freese et al. |
| 2010/0195105 A1 | 8/2010 | Myrick et al. |
| 2010/0211329 A1 | 8/2010 | Farquharson et al. |
| 2010/0245096 A1 | 9/2010 | Jones et al. |
| 2010/0265509 A1 | 10/2010 | Jones et al. |
| 2010/0302539 A1 | 12/2010 | Myrick et al. |
| 2010/0305741 A1 | 12/2010 | Myrick |
| 2010/0328669 A1 | 12/2010 | Myrick et al. |

FOREIGN PATENT DOCUMENTS

| | | | |
|---|---|---|---|
| EP | 1969326 A1 | 9/2008 |
| EP | 1974201 A1 | 10/2008 |
| EP | 2087328 A2 | 8/2009 |
| EP | 2140238 A1 | 1/2010 |
| JP | 57142546 A | 9/1982 |
| JP | 4001558 A | 1/1992 |
| JP | 07-053582 B2 | 6/1996 |
| JP | 11506206 | 6/1996 |
| JP | 9-3662 | 1/1997 |
| JP | 11506207 | 6/1999 |
| WO | 96/30746 | 10/1996 |
| WO | 2004/057284 A1 | 7/2004 |
| WO | 2005/062006 A1 | 7/2005 |
| WO | 2005/062986 A2 | 7/2005 |
| WO | 2006/031733 A2 | 3/2006 |
| WO | 2006/064446 A1 | 6/2006 |
| WO | 2006/137902 A2 | 12/2006 |
| WO | 2007/061435 A1 | 5/2007 |
| WO | 2007/061436 A1 | 5/2007 |
| WO | 2007/061437 A1 | 5/2007 |
| WO | 2007/062202 A1 | 5/2007 |
| WO | 2007/062224 A1 | 5/2007 |
| WO | 2007/064578 A2 | 6/2007 |
| WO | 2008/002903 A2 | 1/2008 |
| WO | 2008/057912 A2 | 5/2008 |
| WO | 2008/057913 A2 | 5/2008 |
| WO | 2008/121684 A1 | 10/2008 |

OTHER PUBLICATIONS

Inon et al. (2006) "Combination of Mid- and Near-Infrared Spectroscopy for the Determination of the Quality Properties of Beers", *Analytica Chimica Acta*, vol. 571, No. 2, pp. 167-174.

Czarnik-Matusewicz et al. (2005) "Temperature-Dependent Water Structural Transitions Examined by Near-IR and Mid-IR Spectra Analyzed by Multivariate Curve Resolution and Two-Dimensional Correlation Spectroscopy", *Analytica Chimica Acta*, vol. 544, No. 1-2, pp. 15-25.

Pimentel et al. (2006) "Determination of Biodiesel Content when Blended with Mineral Diesel Fuel Using Infrared Spectroscopy and Multivariate Calibration", *Microchemical Journal*, vol. 82, No. 2, pp. 201-206.

Ghesti et al. (2006) "Application of Raman Spectroscopy to Monitor and Quantify Ethyl Esters in Soybean Oil Transesterification", *Journal of the American Oil Chemists' Society*, vol. 83, pp. 597-601.

Dereniak et al., Infrared Detectors and Systems, John Wiley & Sons: New York, 1996.

Prystay et al. (1993) "Thermophysical Measurements and Interfacial Adhesion Studies in Ultrathin Polymer Films Using Homodyne Photothermal Spectrometry", *Applied Spectroscopy*, vol. 47, No. 4, pp. 501-514.

Simcock et al. (2006), "Tuning D* with Modified Thermal Detectors", *Applied Spectroscopy*, vol. 60, No. 12, pp. 1469-1476.

Lang, (1994) Ferroelectric Polymers and Ceramic-Polymer Composites, vol. 92-9, pp. 83-142.

Mandelis et al. (1984), "Theory of Photopyroelectric Spectroscopy of Solids", *Journal of Applied Physics*, vol. 57, No. 9, pp. 4421-4430.

Profeta et al. (2007), "Spectral Resolution in Multivariate Optical Computing" *Spectrochimica Acta Part A: Molecular and Biomolecular Spectroscopy*, vol. 67, pp. 483-502.

Power et al. (1993), "Rapid Recovery of Wide Bandwidth Photothermal Signals via Homodyne Photothermal Spectrometry: Theory and Methodology", *Applied Spectroscopy*, vol. 47, No. 4, pp. 489-500.

Workman (2001), Handbook of Organic Compounds: NIR, IR, Raman and UV-Vis Spectra Featuring Polymers and Surfactants (a 3-volume set); Academic Press: San Diego, vol. 3.

Knothe (2006), "Analyzing Biodiesel : Standards and Other Methods", *Journal of the American Oil Chemists Society*, vol. 83, No. 10, pp. 823-833.

M.L. Myrick et al., "Application of Multivariate Optical Computing to Near-Infrared Imaging", Vibration Spectroscopy-based Sensor System, Proceedings of SPIE, vol. 4577, pp. 148-157, 2002.

E.B. Martin et al., "Process Performance Monitoring Using Multivariate Statistical Process Control", IEE Proc.—Control Theory Appl., vol. 143, No. 2, pp. 132-144, Mar. 1996.

Mandelis et al., "Theory of Photopyroelectric Spectroscopy of Solids", Journal of Applied Physics, vol. 57, No. 9, pp. 4421-4430, 1985.

Zagonel et al., "Multivariate Monitoring of Soybean Oil Ethanolysis by FTIR", Talanta, vol. 63, No. 4, pp. 1021-1025, 2004.

Inon et al., " Combination of Mid- and Near-Infrared Spectroscopy for the Determination of the Quality Properties of Beers", Analytica Chimica Acta, vol. 571, No. 2, pp. 167-174, 2006.

Czarnik-Matusewicz et al., Temperature-Dependent Water Structural Transitions Examined by Near-IR and Mid-IR Spectra Analyzed by Multivariate Curve Resolution and Two-Dimensional Correlation Spectroscopy, Analytica Chimica Acta, vol. 544, No. 1-2, pp. 15-25, 2005.

Pimentel et al., "Determination of Biodiesel Content when Blended with Mineral Diesel Fuel Using Infrared Spectroscopy and Multivariate Calibration", Microchemical Journal, vol. 82, No. 2, pp. 201-206, 2006.

Ghesti et al., "Application of Raman Spectroscopy to Monitor and Quantify Ethyl Esters in Soybean Oil Transesterification", Journal of the American Oil Chemists' Society, vol. 83, pp. 597-601, 2006.

Dereniak et al., *Infrared Detectors and Systems*, John Wiley & Sons: New York, Chapter 9, pp. 395-438, 1996.

Prystay et al., "Thermophysical Measurements and Interfacial Adhesion Studies in Ultrathin Polymer Films Using Homodyne Photothermal Spectrometry", Applied Spectroscopy, vol. 47, No. 4, pp. 501-514, 1993.

Simcock et al, "Tuning D* with Modified Thermal Detectors", Applied Spectroscopy, vol. 60, No. 12, pp. 1469-1476, 2006.

Lang, "Ferroelectric Polymers and Ceramic-Polymer Composites", Key Engineering Materials, vol. 92-93, pp. 83-142, 1994.

Profeta et al., "Spectral Resolution in Multivariate Optical Computing", Spectrochimica Acta Part A: Molecular and Biomolecular Spectroscopy, vol. 67, pp. 483-502, 2007.

Power et al., "Rapid Recovery of Wide Bandwidth Photothermal Signals via Homodyne Photothermal Spectrometry: Theory and Methodology", Applied Spectroscopy, vol. 47, No. 4, pp. 489-500, 1993.

Workman, Handbook of Organic Compounds: NIR, IR, Raman and UV-Vis Spectra Featuring Polymers and Surfactants (a 3-vol. set); Academic Press: San Diego, vol. 3, pp. 96-160, 2001.

Knothe, "Analyzing Biodiesel: Standards and Other Methods", Journal of the American Oil Chemists Society, vol. 83, No. 10, pp. 823-833, 2006.

E.D. Palik, *Handbook of Optical Constants of Solids I*, Academic Press, San Diego, pp. 350-357, 1998.

M.L. Myrick, "Multivariate optical elements simplify spectroscopy", Laser Focus World 38, 91-94, 2002.

O. Soyemi et al., "Design and testing of a multivariate optical element: The first demonstration of multivariate optical computing for predictive spectroscopy", Anal. Chem. 73, No. 6, pp. 1069-1079, (2001).

M.L. Myrick et al., "A single-element all-optical approach to chemometric prediction", Vib. Spectrosc. 28, 73-81, 2002.

A.M.C. Prakash et al., "Optical regression: a method for improving quantitative precision of multivariate prediction with single channel spectrometers", Chemom. Intell. Lab. Syst. 46, 265-274, 1999.

R.A. Deverse et al., "Realization of the Hadamard multiplex advantage using a programmable optical mask in a dispersive flat-field near-infrared spectrometer", Appl. Spectrosc. 54, 1751-1758, 2000.

F.G. Haibach et al., "Precision in multivariate optical computing", Appl. Optics 43, 2130-2140, 2004.

M.L. Myrick et al., "Application of multivariate optical computing to simple near-infrared point measurements", Proceedings of the SPIE, Bellingham, VA, US, vol. 4574, pp. 208-215, 2002.

O.S. Heavens, *Optical Properties of Thin Solid Films*, Dover Publications, Inc., Mineola, USA, pp. 62-81, 242-249, 1991.

S. Betancourt et al., "Analyzing Hydrocarbons in the Borehole", Oilfield Review, pp. 54-61, Autumn 2003.

D. Eastwood et al., "Field applications of stand-off sensing using visible/NIR multivariate optical computing", Ground and Air Pollution Monitoring and Remediation, SPIE vol. 4199, pp. 105-114, 2001.

Haibach et al., "On-line Reoptimization of Filter Designs for Multivariate Optical Elements", Applied Optics, vol. 42, No. 10, pp. 1833-1838, Apr. 1, 2003.

Mullins et al., "Gas-Oil Ratio of Live Crude Oils Determined by Near-Infrared Spectroscopy", Optical Methods for Industrial Processes, Proceedings of SPIE vol. 4201, pp. 73-81, 2001.

M.P. Nelson et al., "Multivariate optical computation for predictive spectroscopy", SPIE Vo. 3261, pp. 232-243, 1998.

O. Soyemi et al., "A Simple Optical Computing Device For Chemical Analysis", Proceedings of SPIE Vo. 4284, pp. 17-28, 2001.

O. Soyemi et al., "Design of angle tolerant multivariate optical elements for chemical imaging", Applied Optics, vol. 41, No. 10, pp. 1936-1941, Apr. 1, 2002.

O. Soyemi et al., "Nonlinear Optimization Algorithm for Multivariate Optical Element Design", Applied Spectroscopy, vol. 56, No. 4, pp. 477-487, 2002.

O. Soyemi et al., "Novel Filter Design Algorithm for Multivariate Optical Computing", Advanced Environmental and Chemical Sensing Technology, Proceedings of SPIE Vo. 4205, pp. 288-299, 2001.

Strausz et al., "About the Colloidal Nature of Asphaltenes and the MW of Covalent Monomeric Units", American Chemical Society, Energy and Fuels 16, No. 4, pp. 809-822, 2002 (abstract).

N. Aske et al., "Determination of Saturate, Aromatic, Resin, and Asphitenic (SARA) Components in Crude Oils by Means of Infrared and Near-Infrared Spectroscopy", American Chemical Society, Energy and Fuels 15, No. 5, pp. 1304-1312, 2001.

N. Aske et al., "Asphaltene Aggregation from Crude Oils and Models Systems Studied by High-Pressure NIR Spectroscopy", Energy and Fuels, American Chemical Society, 16, No. 5, pp. 1287-1295, 2002.

Sastry et al., "Determination of Physiocochemical Properties and Carbon-Type Analysis of Base Oils Using Mid-IR Spectroscopy and Partial Least Squares Regression Analysis", American Chemical Society, Energy and Fuels 12, No. 2, pp. 304-311, 1998.

Y. Yan et al. "Fluorescence Fingerprint of Waters: Excitation-Emission Matrix Spectroscopy as a Tracking Tool", Applied Spectroscopy, vol. 54, No. 10, pp. 1539-1542, 2000.

M.P. Nelson et al., "Multivariate optical computation for predictive spectroscopy", Analytical Chemistry, vol. 70, No. 1, pp. 73-82, Jan. 1, 1998.

M.P. Nelson et al., "Fabrication and evaluation of a dimension-reduction fiberoptic system for chemical imaging applications", Review of Scientific Instruments, vol. 70, No. 6, pp. 2836-2843, Jun. 1999.

M.L. Myrick, "New approaches to implementing predictive spectroscopy", Proceedings of the SPIE Conference on Pattern Recognition, Chemometrics, and Imaging for Optical Environmental Monitoring, SPIE vol. 3854, pp. 98-102, Sep. 1999.

M. Groner et al., "Identification of Major Water-Soluble Fluorescent Components of Some Petrochemicals", Marine Pollution Bulletin, vol. 42, No. 10, pp. 935-941, 2001.

M.V. Schiza et al., "Use of a 2D to 1D Dimension Reduction Fiber-Optic Array for Multiwavelength Imaging Sensors", Applied Spectroscopy, vol. 55, No. 2, pp. 217-226, 2001.

M.L. Myrick et al., "Spectral tolerance determination for multivariate optical element design", Fresenius J Anal Chem, 369:351-355, 2001.

R.J. Priore et al., "Miniature Stereo Spectral Imaging System for Multivariate Optical Computing", Applied Spectroscopy, vol. 58, No. 7, pp. 870-873, 2004.

M.L. Myrick et al., "Use of Molecular Symmetry To Describe Pauli Principle Effects on the Vibration-Rotation Spectroscopy of $CO_2(g)$", Journal of Chemical Education, vol. 81, No. 3, pp. 379-382, Mar. 2004.

M.N. Simcock et al., "Precision in imaging multivariate optical computing", Applied Optics, vol. 46., No. 7, pp. 1066-1080, Mar. 1, 2007.

Ozturk et al., "Filtering Characteristics of Hybrid Integrated Polymer and Compound Semiconductor Waveguides", In: Journal of Lightwave Technology, vol. 20, No. 8, pp. 1530-1536, Aug. 2002.

P.G. Miney et al., "A New Optically Reflective Thin Layer Electrode (ORTLE) Window: Gold on a Thin Porous Alumina Film Used to Observe the Onset of Water Reduction", Electroanalysis, 16, No. 1-2, pp. 113-119, 2004.

Mullins et al., "Gas-Oil Ratio of Live Crude Oils Determined by Near-Infrared Spectroscopy", Applied Spectroscopy, vol. 55, No. 2, pp. 197-201, 2001.

Dobrowolski, J.A., et al., "Refinement of Optical Multilayer Systems With Different Optimization Procedures," *Applied Optics*, vol. 29, No. 9, Jul. 1, 1990, pp. 2876-2893.

The Chemistry of Ferric Chloride; Printmaking Today, vol. 4, No. 2, 1995; Cello Press Ltd., Oxon, UK, 2 pages.

MSDS Hyper Glossary is a website http://www.ilpi.com/msds/ref/index.html, Safety Emporium Laboratory and Safety Supplies, retrieved on Feb. 10, 2012, 4 pages.

Handbook of Polymer Coating for Electronic Chemistry and Applications, 2nd ed., 1990.

Ryabenko, A.G., et al., "An Algorithm for Constructing the Basis of Optimal Linear Combinations . . . ", Pattern Recognition and Image Analysis, vol. 3, No. 1, 1993, 12 pages.

Moravskii, A.P., "Spectrophotometrtc Determination of the Yield of the C60 and C70 Fullerenes in Electric Arc Synthesis under Helium", Journal of Analytical Chemistry, vol. 53, No. 12, 1998, 8 pages.

MSDS No. F1080, Material Safety Data Sheet, Mallinckrodt Baker, Inc., Feb. 18, 2003, 6 pages.

Vasil'Ev, G.K., et al., "Rotational and Vibrational Deactivation of Excited HF Molecules", Soy. Physics-JETP, vol. 41, No. 4, 1976, pp. 617-621.

Ryabenko, A.G., et al., "Numerical Study of a Pattern Recognition Multispectral System With Optimal Spectral Splitting," Pattern Recognition and Image Analysis, vol. 1, No. 3, 1991, 10 pages.

\* cited by examiner

CHEMICALLY-SELECTIVE DETECTOR AND METHODS RELATING THERETO

CROSS-REFERENCE TO RELATED APPLICATION

The present application is based on and claims priority to U.S. Provisional Application Ser. No. 61/123,295 having a filing date of Apr. 7, 2008, which is incorporated by reference herein.

BACKGROUND

Traditional infrared measurements of spectrally-overlapped chemical mixtures rely on spectroscopic measurements combined with multivariate statistics. However, traditional methods are experimentally complicated and require time and significant expertise in chemometric analysis.

Traditional photodetectors have fast response times, but they tend to have limited spectral range, must be cooled, and are fairly expensive. Thermal detectors on the other hand, while relatively slow in response, have a wide spectral range, work at room temperature, and are inexpensive.

The present disclosure relies on a thermal detector system that can be applied to a variety of applications where overlapping absorbance peaks are an issue.

SUMMARY

Objects and advantages of the invention will be set forth in part in the following description, or may be obvious from the description, or may be learned through the practice of the invention.

In accordance with certain embodiments of the present disclosure, a method for adjusting the spectral detectivity of a thermal detector is described. The method includes coating the light sensitive portion of a thermal detector with a first material to reduce the response of the detector. The first material is coated with a second material that is thermally thin and has spectral absorption characteristics. The second material is coated with a third material that is thermally thick, whereby the spectral absorbance of the second material as filtered by the third material primarily determines the thermal conversion of the thermal detector.

For instance, in certain embodiments, the first material can be a mirror coating material, such as a gold metal. The second material can be a polymer, such as a near infrared dye that absorbs light in the 860 nm spectral region. The polymer can also include an acrylic resin, such as an isobutyl methacrylate polymer. The thermal detector can be a thermopile detector. The third material can be a polymer. The method can further include providing an electrically insulating coating on the light sensitive portion of the thermal detector prior to coating the light sensitive portion with the first material.

In another embodiment of the present disclosure, a thermal detector is described. The thermal detector comprises a light sensitive detector material, a layer of light reflecting material covering at least a portion of the light sensitive material, a layer of spectral absorption material covering the light reflecting material, and a layer of filter material covering the spectral absorption material.

In still another embodiment of the present disclosure, a method of using a thermal detector to detect a biological fluid is described.

Other features and aspects of the present disclosure are discussed in greater detail below.

BRIEF DESCRIPTION OF THE DRAWINGS

A full and enabling disclosure, including the best mode thereof, directed to one of ordinary skill in the art, is set forth more particularly in the remainder of the specification, which makes reference to the appended figures in which.

DETAILED DESCRIPTION

Reference now will be made in detail to various embodiments of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment, can be used on another embodiment to yield a still further embodiment. Thus, it is intended that the present disclosure covers such modifications and variations as come within the scope of the appended claims and their equivalents.

The present disclosure is a method for a quantitative online mid-infrared (MIR) measurement. The present disclosure allows even a novice technician to easily interpret the output and requires no spectral measurement. This technique relies on thermal detectors that have been optimized to detect and/or reject patterns associated with chemical absorbances.

The present disclosure relates to a method for making chemically-selective detectors for various applications. This technique to determine analytes in spectrally-overlapped chemical mixtures relies on thermal detectors (e.g. thermopile, bolometer, pyroelectric, or the like) that have been optimized to detect and/or reject patterns associated with chemical absorbances. Selective enhancement is accomplished by optimizing the detector to detect and/or reject patterns associated with certain chemical absorbances. To protect the integrity of the detector, the detector is insulated to prevent it from shorting out during modifications. Examples used herein to illustrate the present disclosure use $SiO_2$ for the insulator, but one skilled in the art will understand that materials, including but not limited to quartz and alumina may also be used provided they can be deposited on the detector surface.

Figure 1:
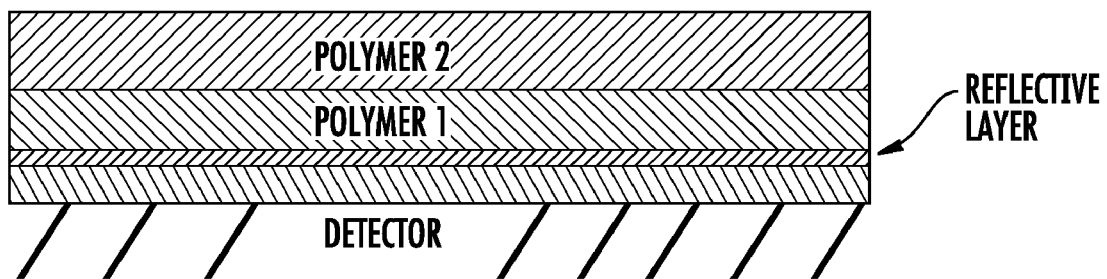
FIG. 1 illustrates a modified detector in accordance with certain embodiments of the present disclosure.

As disclosed and described in U.S. application Ser. No. 12/277,538, filed Nov. 25, 2008, and incorporated by reference herein, thermal detectors can be modified to give spectral responses similar to the absorption of an analyte. The detectors are modified by adding an absorbing polymer layers and a reflective layer. The reflective layer is used to ensure that the detector only responds to the wavelengths of interest (i.e. those that are absorbed by the polymer film). In this regard, any suitable wavelengths are contemplated by the present disclosure including UV, microwave, infrared, or the like. In certain exemplary embodiments of the present disclosure, infrared wavelengths are utilized. In such embodiments, any material that is highly reflective in the infrared range, including but not limited to gold, silver or aluminum, is suitable for use as a reflector. Again, however, other suitable reflective materials are contemplated depending on the wavelength of interest. For instance, other mirror materials, such as interference coatings or the like can be utilized. An absorbing film, such as nylon or polyethylene, is applied to the metallic surface, which gives rise to a thermal detector with a response that is similar to the absorption spectrum of the film, allowing the detector to be 'tuned' to a specific spectral region of interest. In certain embodiments, other absorbing materials can also be utilized. For instance, an absorbing gas can be utilized that is contained within glass. The detector is most sensitive at the absorbed wavelengths and insensitive to other wavelengths. Another variation of this method is to apply another absorbing layer in addition to the reflective layer. The further polymer layer(s) would then act as filters depending on the chopping frequency of the light source. A sketch of a modified detector is shown in FIG. 1.

Modification of the detector described herein includes application of the necessary layers through processes including but not limited to spin coating, dip coating and sputtering. Not all detector types will withstand these modification processes. The detector disclosed and described herein is a thermal detector that can be separated into absorber and thermal components and is robust enough to withstand the coating processes, as would be understood by one of ordinary skill in the art. Thermopile, bolometer, and pyroelectric detectors are examples of exemplary thermal detectors that could be used in accordance with the present disclosure but any suitable thermal detector is contemplated for use herein.

The detector modification disclosed and described herein is not limited to a single, homogeneous polymer film, but the detector can be modified in an infinite number of ways to tune the detectivity to a single substrate or a specific combination of substrates. The detector could be coated with several films, each film of a different polymer, or a single film composed of several polymers. Specificity can be further enhanced with the aid of external filters, such as polymer coated lenses.

The devices and methods described herein can find application in numerous fields. For instance, in certain embodiments, a thermal detector in accordance with the present disclosure can be utilized in the field of forensic analysis.

The following examples are meant to illustrate the disclosure described herein and are not intended to limit the scope of this disclosure.

EXAMPLES

In one embodiment of the present disclosure, a detector can be modified for use in an infrared imaging camera. With the use of filters and coated lenses, a detection system is made that is specific for enhancing the detector's response to fluids, including blood. This type of camera would be beneficial for use at crime scenes, specifically in the determination of the presence of blood or other biological fluids. For example, blood has characteristic peaks in the mid-infrared region at 1545, 1659 and 3298 cm$^{-1}$, which are very close to the characteristic peaks of nylon, which are centered at 1542, 1641 and 3299 cm$^{-1}$. Therefore, the detector in this system could be modified with a layer of nylon to make it most responsive to those wavelengths. One skilled in the art would recognize that other polyamides, as well as different polymers, could also be used as the absorbing material (nylon is just one example). One skilled in the art should also realize that for decent resolution, there is a minimum detector array size that would be necessary (16×16, for example), however there is no upper limit to this array size.

The light source on the imaging camera should be modulated so that the detector is not "over exposed," thereby washing out the image. The modulated light source, with frequency (f), creates a thermal wave within the film due to the absorption of light causing a nonradiative de-excitation to heat waves. This thermal wave is detected and the response is dependant upon the amount of light absorbed by the film. Two characteristics of a film that are important for this type of measurement are the thermal and optical thicknesses of the film. In determining the thermal and optical thickness of a film, the optical absorption depth and thermal diffusion length within the film are first determined. The optical absorption depth (A) is defined as the depth in the film at which the transmission has been reduced by 1/e. This relates to the Naperian absorbance coefficient (β) by $$A(\lambda) = \frac{1}{\beta(\lambda)} \qquad \text{Equation 1}$$

Similarly, the thermal diffusion length ($T_s$) is the depth at which the thermal wave's amplitude has been attenuated by a factor of 1/e and is defined by the equation, $$T_s = \frac{1}{a} = \sqrt{\frac{\alpha}{\pi f}} \qquad \text{Equation 2}$$

where "a" is the thermal diffusivity (m$^2$/s) of the film. From these equations, it is possible to determine the respective thicknesses of the film by $$T_0 = aL_s \qquad \text{Equations 3, 4}$$
$$A_0 = \beta L_s$$

where $L_s$ is the sample thickness, and $T_0$ and $A_0$ are the thermal and optical thickness of the film, respectively. If $T_0$ ($A_0$)<1, then the film is thermally (optically) thin and the thermal wave (light) is transmitted through the sample and is detected by the detector. If $T_0$ ($A_0$)>1, then the film is thermally (optically) thick and the thermal wave (light) does not reach the detector. In this embodiment, a highly reflective surface is deposited onto the detector, and the sample is optically thin when $A_0$<0.5, due to the doubling of the optical path length of the film.

Figure 2:
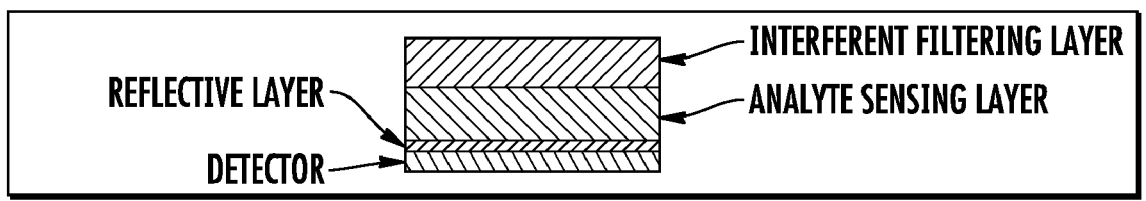
FIG. 2 illustrates modified detectors in accordance with certain embodiments of the present disclosure in which different modulation frequencies are utilized.
Figure 2:
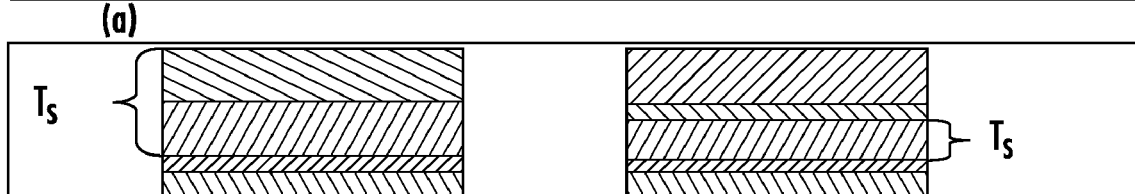
Figure 2:
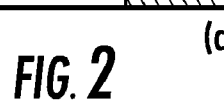

As illustrated in Equations 1 & 2, at a given wavelength, thermal thickness ($T_s$) is dependent on f(Hz), while the optical thickness (A) remains constant. Therefore, by varying the modulation frequency, the sampling depth is controlled. This allows for the development of a sensor with two (or more) polymer layers deposited onto the detector. A modulation frequency could be found that would allow all layers to be thermally thin, which would allow the detection of thermal waves due to the absorption in all layers, as shown in FIG. 2b. This would give a detector response related to the absorbances within each film combined. However, if the light is modulated at a higher frequency, the bottom layer(s) could remain thermally thin while the top layer(s) is outside of $T_s$ and the detector response would correspond only to the absorption within the bottom layer(s), as shown in FIG. 2(c). This would result in the top layer(s) essentially acting as a filter, which would lead to a similar response as if those layers formed a separate filter system in front of the camera.

Figure 3:
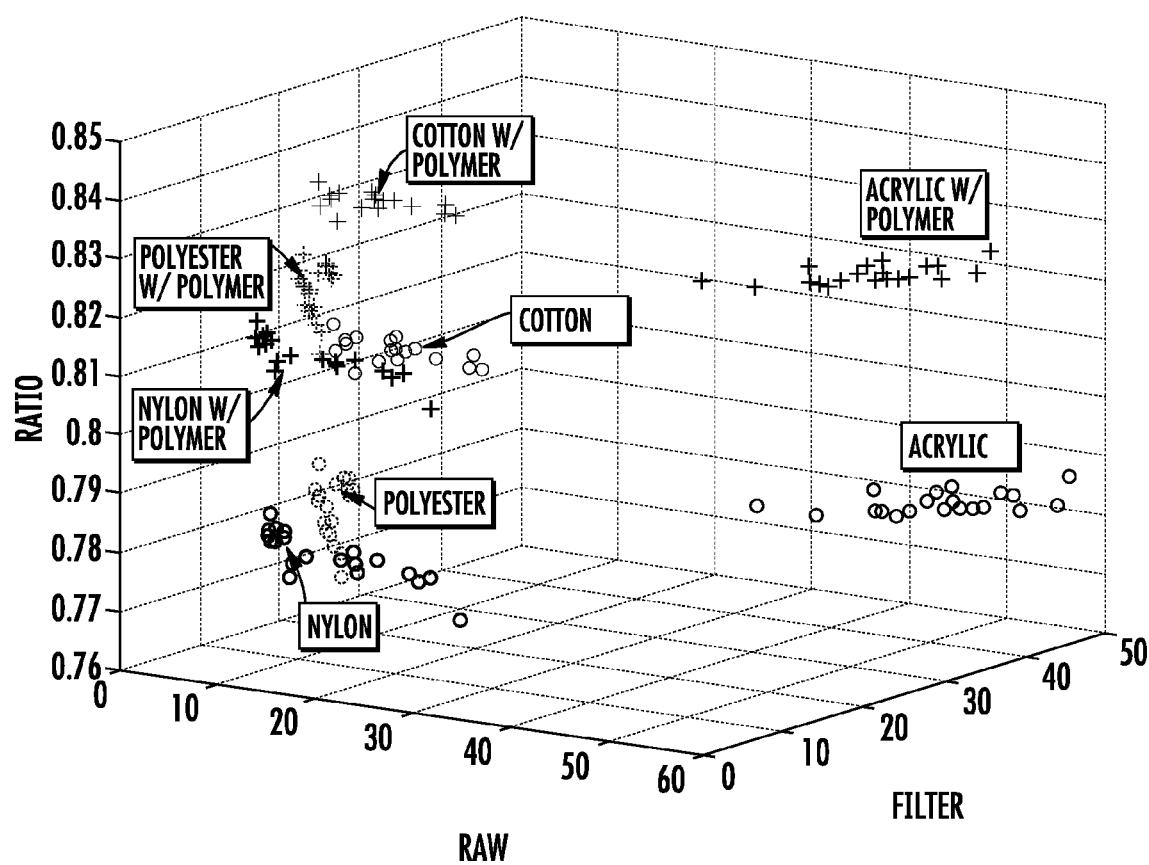
FIG. 3 illustrates a three-dimensional scatter plot of data in a simulation in accordance with certain embodiments of the present disclosure.

The simulations of the camera system disclosed and described herein are based on diffuse reflectance spectra of 4 types of fabrics (nylon, cotton, acrylic, and polyester), a real camera response spectrum, and simulated spectra of polymer films of Acryloid B-67. The first simulation shows how a camera responds to fabrics, with and without polymer stains. The detector is not modified, but a filter made of the same polymer as the stains is placed in front of the camera. This method produces two different responses for each sample type, the "raw" camera response and the camera response with the filter in place. By taking the ratio of these two measurements, there are now three factors that can be used to differentiate the samples. FIG. 3 is a three-dimensional scatter plot of the data. FIG. 3 shows that it is possible, with very little modification to the camera setup, to differentiate between different fabrics and to determine whether there is a polymer stain on a particular fabric.

Figure 4:
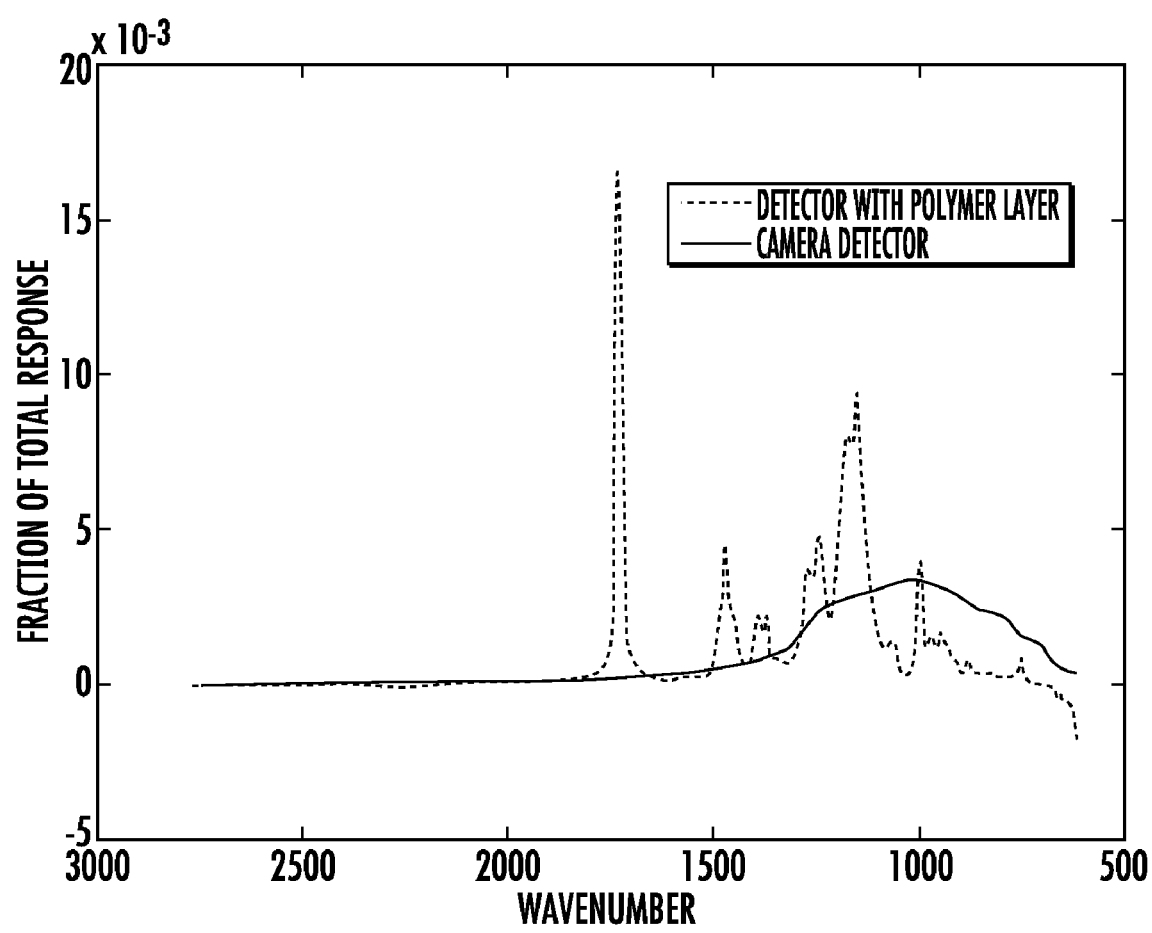
FIG. 4 illustrates a detector response comparison in accordance with certain embodiments of the present disclosure.

The second simulation illustrates the responses of a camera with an altered detector. The detector was chosen to have a response that is the absorbance of the polymer Acryloid B-67. FIG. 4 compares the response of the original camera to that of the new detector.

Figure 5:
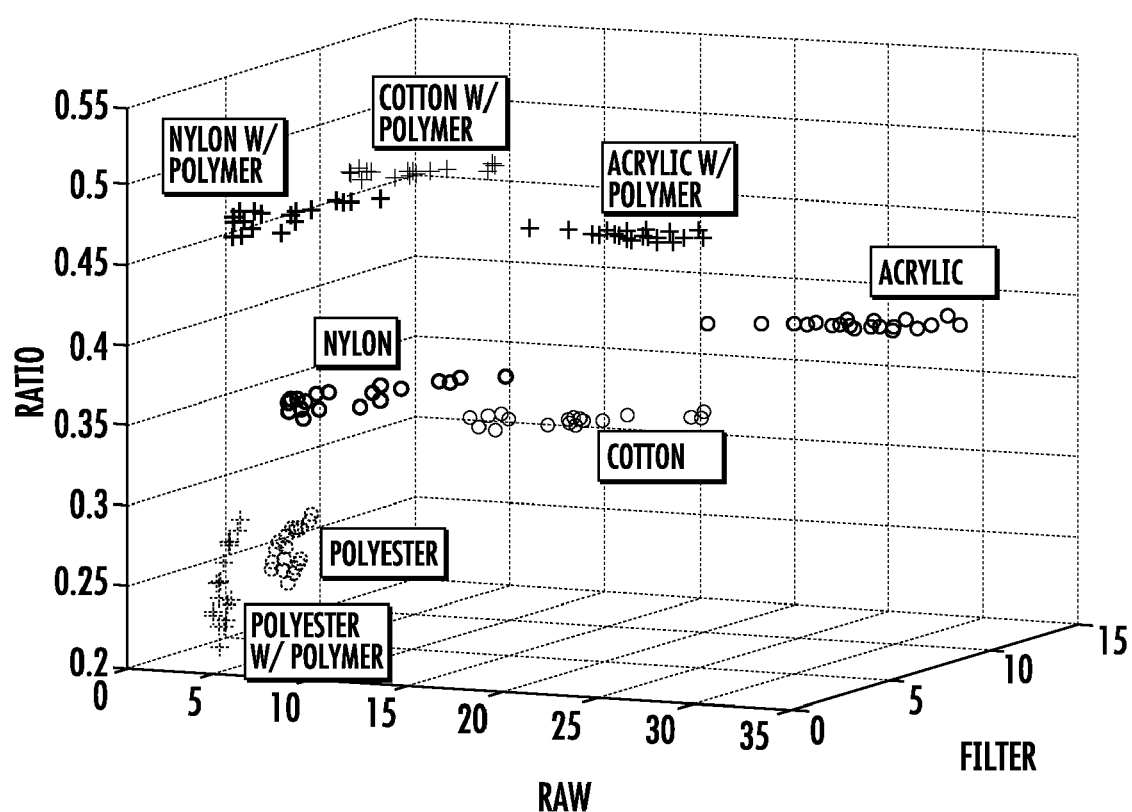
FIG. 5 illustrates a three-dimensional scatter plot of data in a simulation in accordance with certain embodiments of the present disclosure.

The previous simulation was repeated with this new detector and the results are shown in FIG. 5. This illustrates how a very different response is achieved with the same experimental setup, just by changing the detector. FIG. 5 illustrates a clear differentiation between a fabric with a polymer stain and one without a stain. By changing the filter polymer, it is possible to get even better differentiation.

Figure 6:
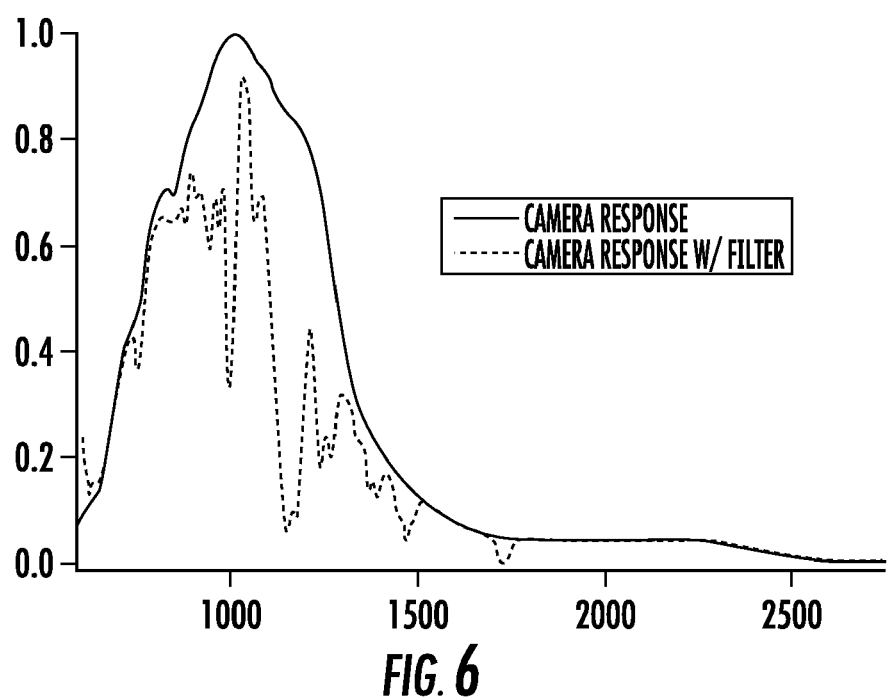
FIG. 6 illustrates a camera response with and without a filter in place.
Figure 7:
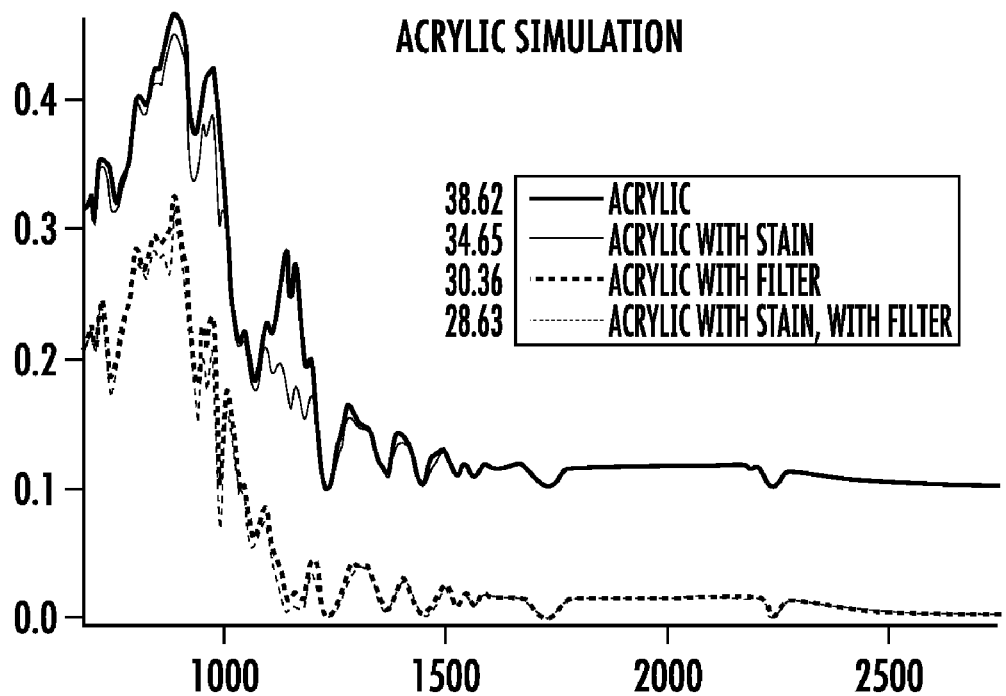
FIGS. 7-10 illustrate the calculated spectral responses for neat and stained fabrics, both with and without a filter in place.
Figure 8:
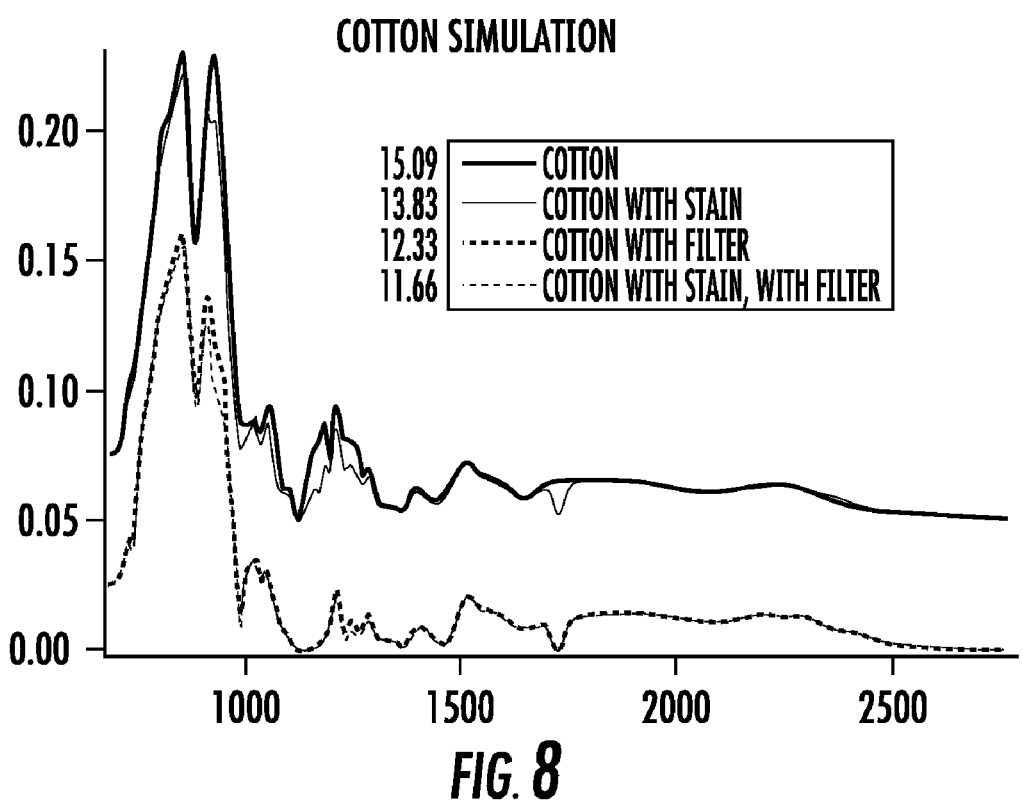
Figure 9:
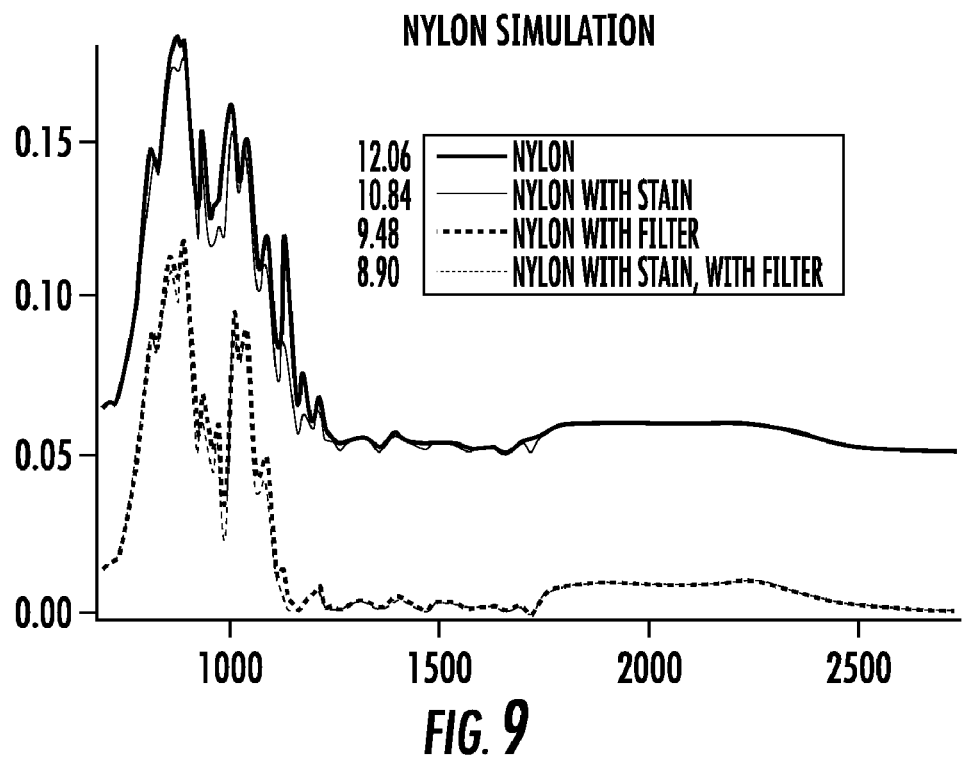
Figure 10:
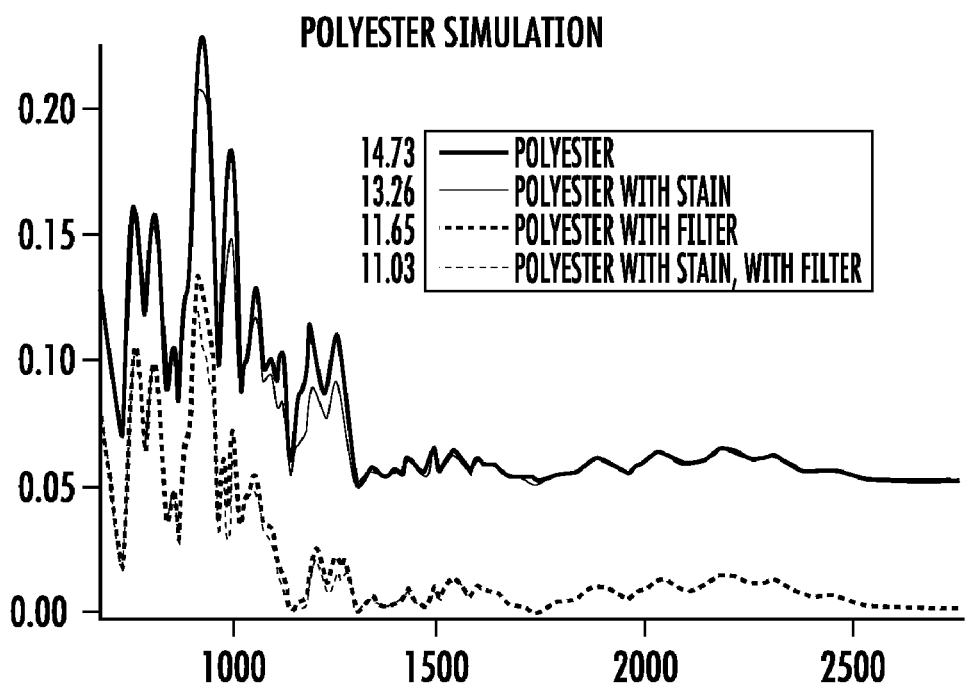

Turning to FIG. 6, a camera response is illustrated with and without a filter in place. The solid black line represents the actual response function provided by the manufacturer. It does not show the wide, flat response that is expected for an unmodified detector, but this is due to the fact that it was taken with the lens in place. The lens is made from germanium, which is transparent in the IR region, and has an anti-reflection film, which is the cause for the non-flat response curve. The red line indicates the expected spectral response with the 1 micron polymer filter in front of the camera. This was calculated by multiplying the camera response and the transmission of the filter.

$$\text{Spectrum} = R_{camera} * T_{filter}$$

FIG. 7-10 illustrate the calculated spectral responses for neat and stained fabrics, both with and without a filter in place. This was calculated as $$\text{Spectrum} = R_{camera} * T_{filter} * R_{fabric}(*T_{polymer}*T_{polymer})$$

For the response without a filter in place, the filter transmission term was left out. The terms in the parentheses are used to simulate the polymer stains. The calculated spectra with the filter in place are offset for clarity. The area under each of the curves was calculated and used for the "pixel contrast" under the different conditions. There is some difference between these outputs on the individual fabrics, but a more quantitative analysis is necessary. The outputs shown in these figures were calculated using the average measured spectrum of each fabric.

In the interest of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure so as further described in such appended claims.

What is claimed is:

1. A method for adjusting the spectral detectivity of a detector, comprising:
   coating the detector with a first material to reduce a response of the detector to light;
   coating the first material with a second material that has a spectral absorbance; and
   coating the second material with a third material, such that the spectral detectivity has a reduced contrast between a sample comprising a pure analyte and a sample comprising an interfering absorbance,
   whereby the spectral absorbance of the second material combined with a spectral absorbance of the third material primarily determines a sensitivity of the detector; and
   wherein the detector is configured to detect an energy from the second material and not from the third material.

2. The method of claim 1, wherein the first material is a mirror coating material.

3. The method of claim 2, wherein the mirror coating is a metal.

4. The method of claim 3, wherein the metal is gold.

5. The method of claim 1, wherein the second material is a polymer.

6. The method of claim 5, wherein the polymer comprises a near infrared dye.

7. The method of claim 6, wherein the dye absorbs light in the 860 nm spectral region.

8. The method of claim 5, wherein the polymer comprises an acrylic resin.

9. The method of claim 8, wherein the acrylic resin comprises an isobutyl methacrylate polymer.

10. The method of claim 1, wherein the detector comprises a thermopile detector.

11. The method of claim 1, wherein the third material is a polymer.

12. The method of claim 1, further comprising:
    providing an electrically insulating coating on a light sensitive portion of the detector prior to coating the detector with the first material.

13. The method of claim 12, wherein the electrically insulating material is a $SiO_2$ film.

14. The method of claim 1 wherein the third material is optically thick for the interfering absorbance.

15. The method of claim 14 wherein the optically thick material comprises a sample thicker than an absorption depth of the material.

16. The method of claim 1 wherein the energy is a thermal energy.

17. The method of claim 16 wherein the third material is a thermally thick material when the detector is used with a light source that is modulated at a frequency.

18. The method of claim 17 wherein the thermally thick material comprises a sample thicker than a thermal diffusion length for the frequency.

19. The method of claim 17 wherein the frequency is chosen such that the second material is thermally thin and the third material is thermally thick.

20. The method of claim 17 wherein the light source is modulated at a frequency using an optical chopper.

21. The method of claim 1 wherein a pure analyte is selected from the group consisting of nylon, cotton, acrylic, and polyester.

22. The method of claim 1 wherein an interfering absorbance comprises a polymer stain.

23. A detector, comprising:
a layer of light reflecting material disposed on at least a portion of a light sensitive material;
a layer of spectral absorption material covering the light reflecting material; and
a layer of filter material covering the spectral absorption material such that the spectral detectivity has a reduced contrast between a sample comprising a pure analyte and a sample comprising an interfering absorbance, wherein the detector is coupled to detect an energy from the spectral absorption material and not from the filter material.

24. A detector as in claim 23, further comprising:
a layer of insulating material between the detector and said light reflecting material.

25. A detector as in claim 23, wherein the light reflecting material is a metal.

26. A detector as in claim 23, wherein the filter material is a polymer.

27. A detector as in claim 26, wherein the polymer comprises an acrylic resin.

28. A detector as in claim 26, wherein the spectral absorption material is a polymer.

29. A method of detecting the presence of a fluid, comprising:
receiving light in a detector to detect a fluid, the light containing information about a fluid, the detector comprising a light sensitive detector material, a layer of light reflecting material covering at least a portion of the light sensitive material, a layer of spectral absorption material covering the light reflecting material, and a layer of filter material covering the spectral absorption material; wherein the layer of filter material has a thickness such that the spectral detectivity has a reduced contrast between a sample comprising a pure analyte and a sample comprising an interfering absorbance; and
the detector is configured to detect an energy from the second material and not from the
third material.

* * * * *